US012688847B2

(12) United States Patent
Constantin et al.

(10) Patent No.: US 12,688,847 B2
(45) Date of Patent: Jul. 21, 2026

(54) ERROR-CORRECTION AND EXTRACTION IN REQUEST DIALOGS

(71) Applicant: ZOOM VIDEO COMMUNICATIONS, INC., San Jose, CA (US)

(72) Inventors: Stefan Constantin, Karlsruhe (DE); Alexander Waibel, Sammamish, WA (US)

(73) Assignee: Zoom Communications, Inc., San Jose, CA (US)

(*) Notice: Subject to any disclaimer, the term of this patent is extended or adjusted under 35 U.S.C. 154(b) by 125 days.

(21) Appl. No.: 17/783,083

(22) PCT Filed: Dec. 14, 2020

(86) PCT No.: PCT/US2020/064828
§ 371 (c)(1),
(2) Date: Jun. 7, 2022

(87) PCT Pub. No.: WO2021/119586
PCT Pub. Date: Jun. 17, 2021

(65) Prior Publication Data
US 2023/0013768 A1 Jan. 19, 2023

Related U.S. Application Data

(60) Provisional application No. 62/947,946, filed on Dec. 13, 2019.

(51) Int. Cl.
G10L 15/01 (2013.01)
G10L 15/06 (2013.01)
G10L 15/22 (2006.01)

(52) U.S. Cl.
CPC ............ G10L 15/01 (2013.01); G10L 15/063 (2013.01); G10L 15/22 (2013.01)

(58) Field of Classification Search
CPC ....... G10L 15/01; G10L 15/063; G10L 15/22; G06F 40/30; G06F 40/284; G06N 3/045; G06N 3/08
See application file for complete search history.

(56) References Cited

U.S. PATENT DOCUMENTS 7,860,719 B2 12/2010 Maskey et al.
9,514,098 B1 * 12/2016 Subramanya ......... G06F 40/284
(Continued)

FOREIGN PATENT DOCUMENTS

JP 2018513405 A 5/2018
WO 2019142427 A1 7/2019

OTHER PUBLICATIONS

Li, X., Chen, Y. N., Li, L., Gao, J., & Celikyilmaz, A. (2017). End-to-end task-completion neural dialogue systems. arXiv preprint arXiv:1703.01008. (Year: 2017).*
(Continued)

*Primary Examiner* — Bhavesh M Mehta
*Assistant Examiner* — Philip H Lam
(74) *Attorney, Agent, or Firm* — Kilpatrick Townsend and Stockton LLP

(57) ABSTRACT

A system comprises a machine that is configured to act upon requests from a user and sensing means for sensing an operational-mode dialog stream from the user for the machine. The system also comprises a computing system that is configured to train a neural network through machine learning to output, for each training example in a training dialog stream dataset, a corrected request for the machine. The computing system is also configure to, in an operational mode, using the trained neural network, generate a corrected, operational-mode request for the machine based on the operational-mode dialog stream from the user for the
(Continued)

| request | correction | cook | rice | for | me | no | curry | rice |
|---|---|---|---|---|---|---|---|---|
| labels | | C | R1 | C | C | D | S1 | S1 |
| corrected request | | cook curry rice for me | | | | | | |
| pairs of reparandum and repair entity | | rice → curry rice | | | | | | | machine, wherein the operational-mode dialog stream is sensed by the sensing means.

20 Claims, 5 Drawing Sheets

(56) References Cited

U.S. PATENT DOCUMENTS

| | | | | |
|---|---|---|---|---|
| 10,431,207 | B2 * | 10/2019 | Angkititrakul | ......... G10L 15/16 |
| 2008/0004865 | A1 * | 1/2008 | Weng | .................... G06F 18/211 |
| | | | | 704/9 |
| 2008/0046229 | A1 | 2/2008 | Maskey et al. | |
| 2011/0040554 | A1 * | 2/2011 | Audhkhasi | ............. G09B 19/04 |
| | | | | 704/235 |
| 2017/0116185 | A1 * | 4/2017 | Erickson | ............... G06F 40/253 |
| 2017/0161256 | A1 * | 6/2017 | Hori | ........................ G06F 40/35 |
| 2017/0213546 | A1 * | 7/2017 | Gilbert | .................... G06F 40/30 |
| 2018/0090140 | A1 * | 3/2018 | Georges | ................ G10L 15/142 |
| 2018/0268813 | A1 * | 9/2018 | Georges | ................ G06F 40/237 |
| 2018/0370029 | A1 * | 12/2018 | Hall | .................... G06F 11/0715 |
| 2018/0370032 | A1 * | 12/2018 | Ichikawa | ............. B25J 11/0015 |
| 2019/0001489 | A1 * | 1/2019 | Hudson | .................. B25J 9/1602 |
| 2019/0197109 | A1 * | 6/2019 | Peters | .................. G06F 40/295 |
| 2019/0197185 | A1 * | 6/2019 | Miseldine | .............. G06N 20/00 |
| 2019/0224849 | A1 | 7/2019 | Tan et al. | |
| 2019/0244603 | A1 * | 8/2019 | Angkititrakul | ..... G10L 15/1815 |
| 2019/0295546 | A1 | 9/2019 | Sugiyama et al. | |
| 2019/0340485 | A1 | 11/2019 | Ngo et al. | |
| 2019/0384815 | A1 * | 12/2019 | Patel | .................... G06F 40/151 |

OTHER PUBLICATIONS

Broad, A., Arkin, J., Ratliff, N., Howard, T., & Argall, B. (2017). Real-time natural language corrections for assistive robotic manipulators. The International Journal of Robotics Research, 36(5-7), 684-698. (Year: 2017).*

Matuszek, C., Herbst, E., Zettlemoyer, L., & Fox, D. (2013). Learning to parse natural language commands to a robot control system. In Experimental robotics: the 13th international symposium on experimental robotics (pp. 403-415). Springer International Publishing. (Year: 2013).*

EP Exended Search Report and Opinion for EP20898102.7 mailed Dec. 6, 2023.

Shalyminov et al., "Multi-Task Learning for Domain-General Spoken Disfluency Detection in Dialog Systems", arxiv.org, Oct. 8, 2018; pp. 1-9.

Wu et al., "ScratchThat: Supporting Command-Agnostic Speech Repair in Voice-Driven Assistants", Proceedings of the ACM on Interactive, Mobile, Wearable and Ubiquitous Technologies, ACMPUB27, New York, NY, vol. 3, No. 2, Jun. 21, 2019; pp. 63:1-63:17.

Dong et al., "Adapting Translation Models for Transcript Disfluency Detection", Proceedings of the Association for the Advancement of Artificial Intelligence Conference on Artificial Intelligence, vol. 33, No. 1, Jul. 17, 2019, pp. 6351-6358.

Application No. JP2022-535208 , Office Action, Mailed On Feb. 14, 2025, 13 pages.

Application No. EP20898102.7 , Office Action, Mailed On Nov. 11, 2025, 14 pages.

Application No. JP2022-535208 , Office Action, Mailed On Oct. 21, 2025, 6 pages.

* cited by examiner knives in the   drawer        uh     sink reparandum interruption point interregnum repair Figure 1: disfluent utterance annotated with repair terminology knives    in    the    drawer    uh    sink
  C        C      C       D        D      C Figure 2: disfluent utterance labeled with copy and delete labels knives   in the drawer          no    forks reparandum          interruption point interregnum repair Figure 3: request and correction phrase annotated with repair terminology example request templates:
can you put the *object* into the *location*
the *location* is the place where you put the *object* example correction templates:
no the *other object than in the request template* into the *other location than in the request template*
i meant the *other location than in the request template*

FIG. 5

|  | validation | test |
|---|---|---|
| unknown entities | 100 | 205 |
| unknown templates | 100 | 606 |
| unknown entities and templates | 100 | 584 |
| out-of-domain entities and templates | 100 | 332 |
| sum | 400 | 1727 |

FIG. 6

| request | correction | cook | rice | for | me | no | curry | rice |
|---|---|---|---|---|---|---|---|---|
| labels | | C | R1 | C | C | D | S1 | S1 |
| corrected request | | cook curry rice for me | | | | | | |
| pairs of reparandum and repair entity | | rice → curry rice | | | | | | |

FIG. 7

| | validation | test |
|---|---|---|
| unknown entities | 100% | 98.54% |
| unknown templates | 97% | 97.03% |
| unknown entities and templates | 91% | 90.24% |
| out-of-domain entities and templates | 82% | 88.55% |
| all together | 92.50% | 93.28% |

FIG. 8

ERROR-CORRECTION AND EXTRACTION IN REQUEST DIALOGS

PRIORITY CLAIM

The present application claims priority to U.S. provisional application Ser. No. 62/947,946, filed Dec. 13, 2019, with the same title and inventors as stated above, and which is incorporated herein by reference in its entirety.

BACKGROUND

Errors and ambiguities are difficult to avoid in a dialog. Corrections allow to recover from errors and to disambiguate ambiguities. For example, a household robot gets the request, "Put the cleaned knives into the cutlery drawer," but the robot does not know which one of the drawers is the cutlery drawer. It can choose one of the drawers and puts the knives there. If its choice is wrong, the user must correct the robot, e.g., "No, into the drawer right of the sink." Alternatively, the robot can ask which one of the drawers is the cutlery drawer. The clarification response of the human, e.g., "It's the drawer right of the sink," is also a correction because the response disambiguates the ambiguity. Another type of correction occurs when the user changes their mind, e.g., "I changed my mind, the forks."

SUMMARY

All these correction types can be processed in the same manner and, therefore, the present invention is directed to, in one general aspect, a software-based, machine learning component that gets a request and a correction and outputs a corrected request. To get this corrected request, in one implementation, the entities in the correction phrase replace their corresponding entities in the request. The request, "Put the cleaned knives into the cutlery drawer" with its correction, "No, into the drawer right of the sink" is converted to "Put the cleaned knives into the drawer right of the sink." Such a component has two advantages compared to handling the corrections in the actual dialog component. First, it reduces the amount of required training data for the actual dialog component because corrections will not need to be learned if there is an open-domain correction component. Second, this kind of correction component can be extended so that it outputs the pairs of reparandum and repair entity. In this example there is one pair: cutlery drawer and drawer right of the sink. These entity pairs can be used, for example, for learning in a life-long learning component of a dialog system to reduce the need for correction in future dialogs, e.g., the robot can learn which one of the drawers is the cutlery drawer.

In one general aspect, therefore, the present invention is directed to system that comprises a machine, sensing means, and a computer system. The machine, which could be a robot or computer, for example, is configured to act upon requests from a user. The sensing means is for sensing an operational-mode dialog stream from the user for the machine. The computer system comprise a neural network that is trained through machine learning to output, for each training example in a training dialog stream dataset, a corrected request for the machine. The computer system is also configured, in an operational mode, using the trained neural network, to generate a corrected, operational-mode request for the machine based on the operational-mode dialog stream from the user.

In another general aspect, the present invention is directed to a method that comprises the step of training a neural network through machine learning to output, for each training example in a training dialog stream dataset, a corrected request for the machine, wherein the machine is configured to act upon requests from a user. The method also comprises the steps of, in an operational mode of the neural network after training the neural network: (i) sensing, by sensing means, an operational-mode dialog stream from a user for the machine; and (ii) generating, by a computer system that is in communication with the sensing means, using the trained neural network, a corrected, operational-mode request for the machine based on the operational-mode dialog stream.

These and other benefits that are realizable through implementations of the present invention will be apparent from the description that follows.

FIGURES

Various implementations and embodiments of the present invention are described herein by way of example in conjunction with the following figures.

FIG. 1 is depicts a disfluent utterance annotated with repair terminology.

FIG. 2 depicts a disfluent utterance labeled with copy (C) and delete (D) labels.

FIG. 3 depicts a request and correction phase annotated with repair terminology.

FIG. 5 depicts example templates for generating the training dataset for the error-correction module neural network of FIG. 4 according to various embodiments of the present invention.

FIG. 6 depicts validation and test dataset sizes for an example for training the error-correction module neural network of FIG. 4 according to various embodiments of the present invention.

FIG. 7 depicts sequence labeling and sequence-to-sequence approaches according to various embodiments of the present invention.

Figure 4:
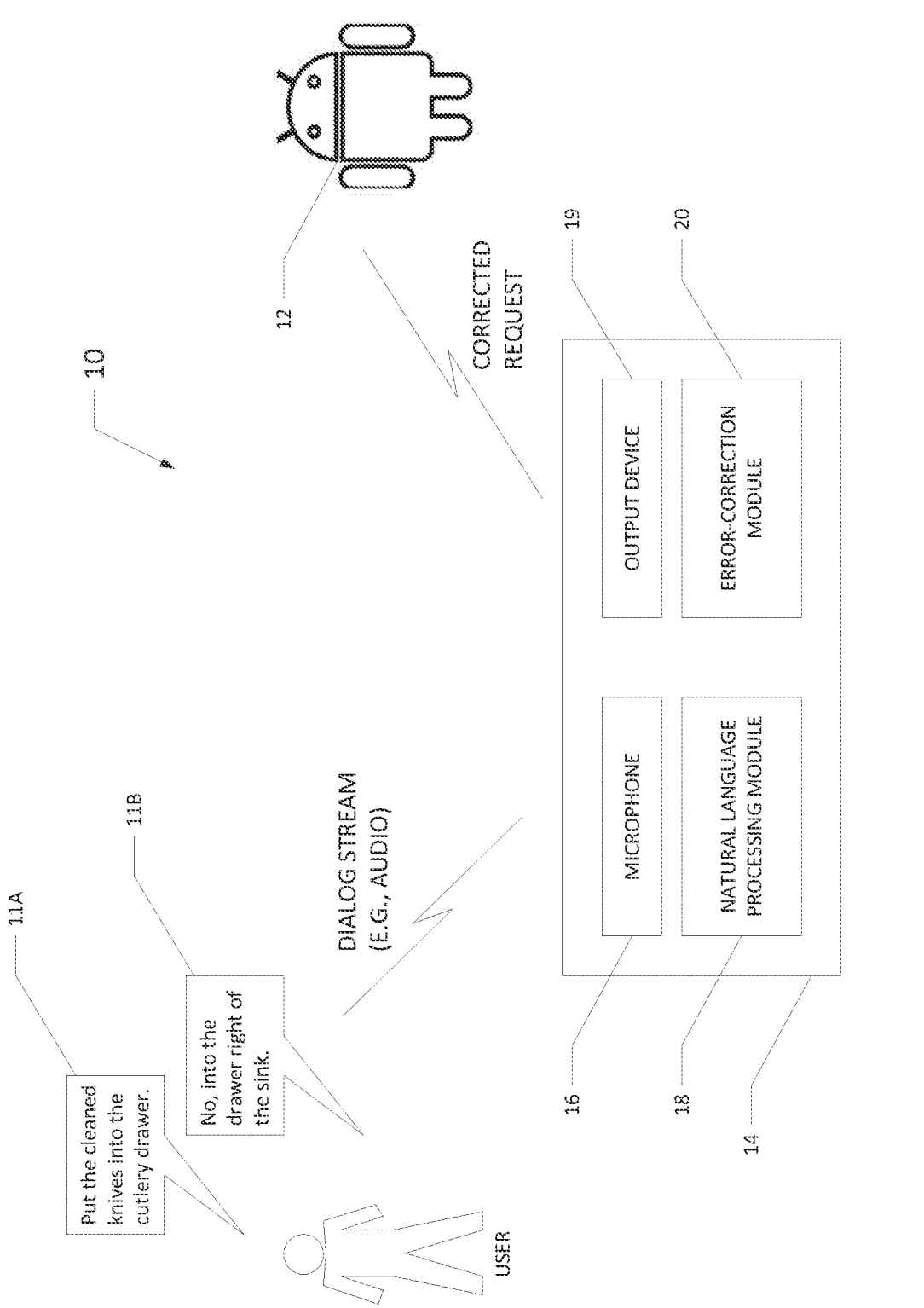
FIG. 4 depicts a system according to various embodiments of the present invention.

FIG. 8 lists evaluation results for the error-correction module neural network of FIG. 4 according to various embodiments of the present invention.

Figure 9:
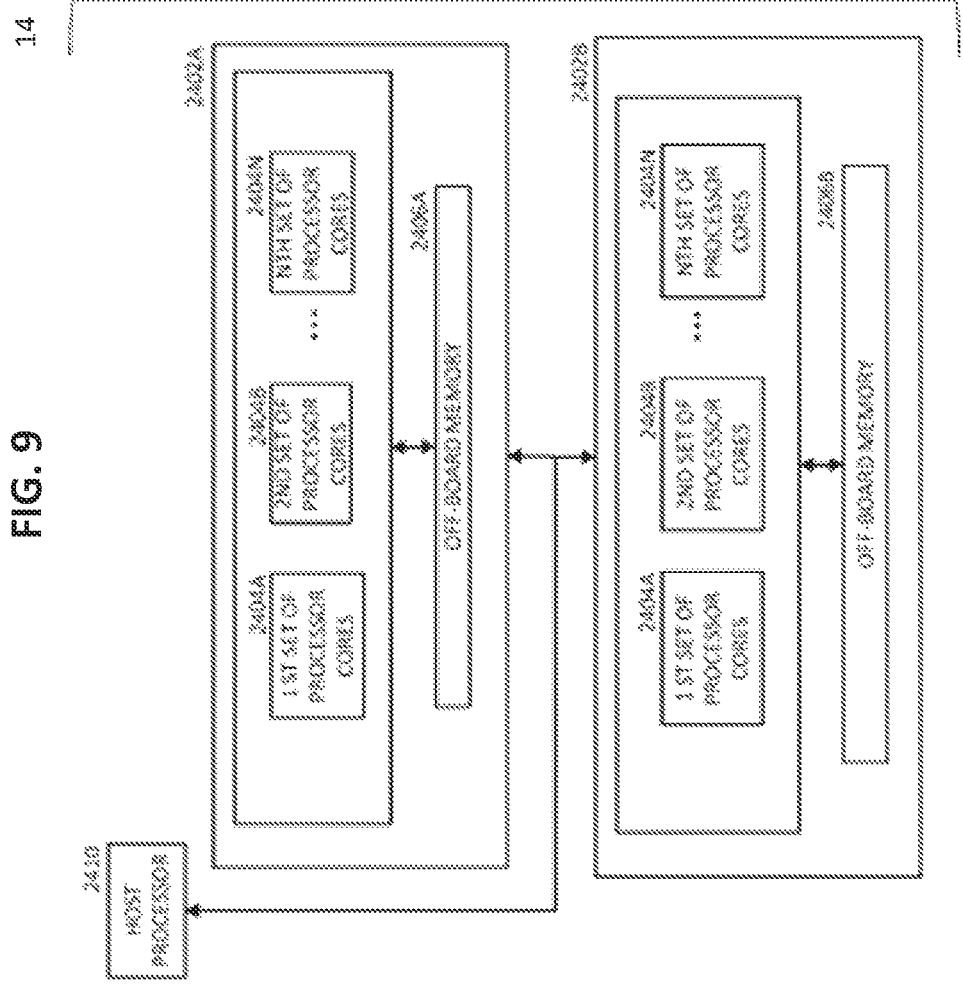

FIG. 9 depicts the computer system of FIG. 4 according to various embodiments of the present invention.

DESCRIPTION

Figures 1, 2, 3:
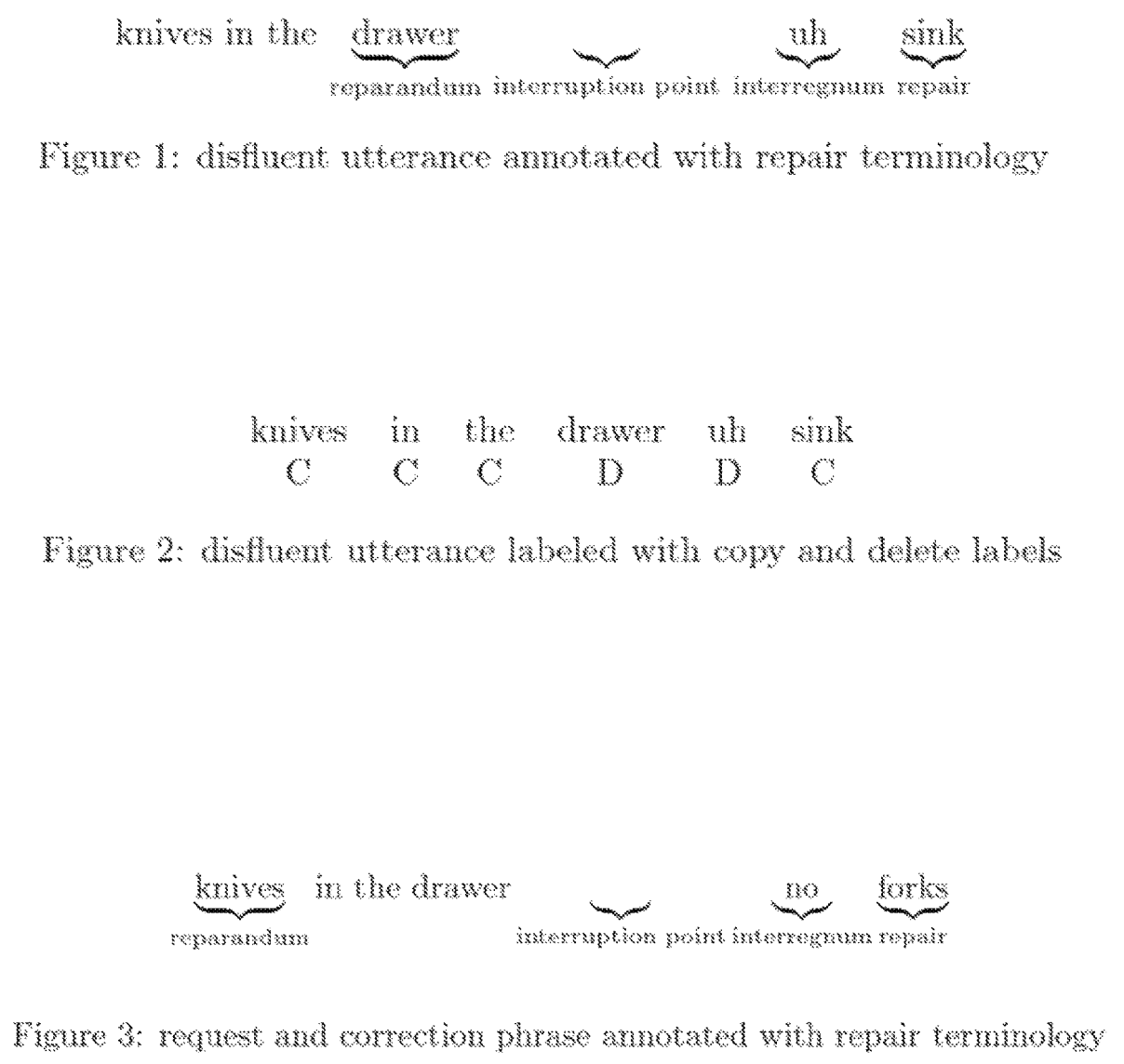

The task of request correction is related to the task of disfluency removal. In disfluency removal, there are the reparandum (which entity should be replaced), the interruption point (where the correction begins), the interregnum (which phrase is the signal phrase for the correction), and the repair phrase (the correct entity). FIG. 1 depicts a disfluent utterance annotated with this terminology.

A lot of work has been conducted for disfluency removal. In these works, it is assumed that it is enough to delete tokens of the disfluent utterance to get a fluent utterance. A disfluent utterance with the copy and delete labels is depicted in FIG. 2. However, in the task of corrections, long-distance replacements can occur. Such a long-distance replacement is depicted in FIG. 3.

In one general aspect, the present invention is directed to a system that makes error correction in a request or dialog stream. FIG. 4 is an example of a system according to various embodiments. As shown in FIG. 4, the system 10 can comprise a user and a machine, where the user outputs a communication, or exchange, such as a dialog stream, that includes, for example, a request 11A and, when necessary, a correction 11B for the machine. The correction 11B can be issued by the user in response to, for example, a question (audible or text) from (directly or indirectly) the machine or in response to the user seeing or otherwise sensing an incorrect action by the machine. The machine can be any machine that performs actions in response to commands or requests in the dialog stream from the user, such as the electromechanical robot 12 depicted in FIG. 4, where the robot is capable of movement. In other embodiments, the machine could be a computer device, such as a laptop, a PC, a server, a workstation, a mainframe, a mobile device (e.g., a smartphone or a tablet computer), a wearable computer device or a digital personal assistant, for example. In still other implementations, the machine could be an appliance or tool that comprises a processor(s), such as a kitchen or other household appliance, a power tool, a medical device, a medical diagnostic device, an automotive system (e.g., an electronic or engine control unit (ECU) of a vehicle), etc. The machine could also be, or be part of, an autonomous, mobile device, such as an autonomous vehicle.

As depicted in FIG. 4, the system 10 comprises a computer system 14 that, in various implementations, receives the dialog stream (e.g., including the request 11A and correction 11B) from the user, and generates therefrom the corrected request for the machine. The computer system 14 may comprise a sensing means for sensing the request and corrections from the user. For example, as depicted in the example of FIG. 4, where the user issues audible requests, the sensing means may comprise a microphone(s) 16 and a natural language processing (NLP) module 18 for processing the audible utterances from the user picked up by the microphone 16. The computer system 14 also comprises an error correction module 20, which preferably implements a machine-learning neural network that is trained, for example, to generate a corrected request for the machine based on the received dialog stream. The computer system 14 can also comprise an output device 19 that outputs the corrected request to the robot/machine.

The sensing means could comprise a microphone 16 and NLP module 18 as depicted in FIG. 4. In that connection, the responses (e.g., corrections) by the user could be verbal responses. In other implementations, other types of sensing means could be used (in addition to or in lieu of) a microphone, depending on the context and purpose of the system 10. For example, the sensing means could also comprise a motion sensor, such as motion sensor on the robot 12, that senses a corrected motion imparted on the robot 12 by the user (or somebody or something else). Using the kitchen robot example, the user could push the robot 12 toward the cutlery drawer and the computer system 14 could use that sensed motion input from the user to the robot 12 as the correction in order to generate the corrected request. The motion sensor could be an accelerometer and/or a gyroscope.

The sensing means could also comprise (1) a camera that captures motions, such as physical responses, motions or gestures, from the user and (2) a module (e.g. a neural network) that has been trained to interpret the physical responses, motions or gestures from the user as the request 11A or the clarification 11B, as the case may be. Also, the sensing means could comprise, for example, (1) a touch-sensitive display on the computer system 14, that receives touch inputs from the user and (2) a module for interpreting the touch inputs from the user. Also, sensing means could comprise a software program for receiving and processing text from the user. For example, the user may utilize an "app" (e.g., a software application for a mobile device) or other type of computer program (e.g., a browser) to generate a text-based dialog stream, including text-based requests and corrections for the robot 12.

In that connection, the term "dialog stream" as used herein is not limited to dialog that comprises solely spoken words or text. Rather, a dialog stream can a sequence of request and a subsequent clarification to the request in a form or modality suitable for making the request and clarification, including spoken words, text, a gesture that is recognized by a camera system, an input received by a touch-user interface, a sensed motion that is imparted on the robot by the user, etc. Also, the original request and the clarification can use the same or different modalities. For example, the original request could comprise spoken words or text, and the subsequent clarification could comprise a recognized gesture by the user, an input received from the user via a touch-user interface, a sensed motion that is imparted on the robot by the user, etc. Also, the user does not need to be a single person. One person could make the initial request and another person could make the clarification. Also, the user does not even need to be a person, but instead the user could be an intelligent system, such as a virtual assistant (e.g., Apple Siri, Google Assistant, Amazon Alexa, etc.) or some other type of intelligent system.

The user requests for the machine could be, for example, direct requests or imperatives for the machine. For a kitchen-based robot machine, the request or imperative could be something like, "Make me some tea." The user requests could also be less direct, like perceived or detected intentions of the user for the machine. Continuing with the kitchen-based robot example, the user could say, "I would like some tea." The machine could be trained in that case to translate the user's intention to "have some tea" to a request for the kitchen robot to make some tea. Thus, as used herein, the term "user-intention" refers to an intention by the user for the machine, which user-intention could be a direct request or imperative for the machine, but could also be a perceived intention for the user of the machine.

Also, although various embodiments and implementations of the system are described herein in terms of a "dialog stream" between the user and the machine, it should be clear from the description that the "dialog stream" does not necessarily need to include spoken dialog; it does not necessarily require sequential dialog; and is not necessarily limited to a two-person dialog (e.g., the user and the machine). For example, as explained herein, in addition to or in lieu of speech, the user could express a user-intention for the machine using text or motions. The motions could be gestures, head nods, movements imparted on the machine by the user, etc. The sensing means should be configured to detect the user-intentions, in any form, expressed by the user. In that connection, the sensing means could comprise a microphone, a NLP for text or speech, a motion sensor, a camera, a pressure sensor, a proximity sensor, a humidity sensor, an ambient light sensor, a GPS receiver, and/or a touch-sensitive display (e.g., for receiving input from the user via the touch-sensitive display). The dialog steam or communication exchanges between the user and the machine need not be sequential. All or portions of the stream or exchange could be in parallel or simultaneous.

FIG. 4 depicts the computer system 14 as being discrete and separate from the user and machine. In this depicted embodiment, the computer system 14 could issue an audible corrected request, in which case the output device 19 is a loudspeaker in the vicinity of the robot 12, that is picked-up by a microphone of the robot 12 and processed accordingly by the robot. In other implementations, the output device 19 is a wireless communication circuit that issues an electronic, wireless communication, via a wireless network, to the robot 12. The wireless data network can comprise an ad hoc and/or infrastructure wireless network, such as a Bluetooth network, a Zigbee network, a Wi-Fi network, a wireless mesh network, or any other suitable wireless network.

In other implementations, the computer system 14 could be part of, or integrated with, the robot/machine 12. That is, for example, the sensing means and the error-correction module 19 could be part of, or integrated with, the robot/machine 12. In that case, the output device 19 can issue a command via a data bus to a controller of the robot/machine 12 that controls operation of the robot/machine 12.

The computer system 14 could also comprise a distributed system. For example, the microphone 14 or other input device could be part of a device held, used by or carried by the user, that is in wireless communication with a remote NLP module 18 and error-correction module 20. For example, the NLP module 18 and error-correction module 20 could be part of a cloud computing system or other computing system that is remote from the microphone (or other input device). In that case, the input device could be in wireless communication (e.g., ad hoc and/or infrastructure wireless networks, such as Wi-Fi) with the NLP module 18.

The error-correction module 20 can be implemented with one or more (e.g., an ensemble of) machine learning networks, such a deep neural networks, that is/are trained through sufficient training examples to generate the corrected requests for the robot/machine based on the received dialog stream from the user. In various implementations, the training can consider and leverage the intended context or domain for the robot/machine. For example, for the kitchen robot example, the error-correction module 20 can leverage the dialog stream and/or the corrected request are likely to include terms related to a kitchen (e.g., drawer, knife, fork, etc.). Similarly, for a medical diagnostic setting, the error-correction module 20 can leverage the dialog stream and/or the corrected request are likely to include medical terms, and so on.

The following describes one way of training the neural network. A dataset with requests and corresponding corrections can be created. Outputs of the robot/machine like error actions and clarification questions are not part of the dataset. For example, the training dataset can be in a particular domain, such as a kitchen robot. One version of the dataset can focus on the task of bringing a specified object to a specified location and cooking a specified recipe. Many (e.g., 20) utterances and correspondingly many (e.g., 20) correction responses from each of several (e.g. 7) participants for the task of bringing a specified object to a specified location. For the task of cooking a specified recipe, again several (e.g., 10) utterances and correspondingly several (e.g., 10) correction responses from each of the participants can be collected. Examples of the collected data are the request "Put the cleaned knives into the cutlery drawer," the correction of the robot's wrong action, "No, into the drawer right of the sink," the clarification "It's the drawer right of the sink," or the user's change of mind, "I changed my mind, the forks." Correction responses were collected to correct or clarify the object, the location, the object and the location, or the recipe. The collected data was used to build templates that try to cover the natural language variety. To increase this variety, synonyms, new objects, new locations, and/or new recipes can be added to the collected data. Example templates are depicted in FIG. 5. For example, 15 templates for the requests can be created and 45 templates for the correction responses can be created, such that 74,309 request and correction pairs can be used for training the error-correction module 20.

The dataset in this context can have two targets. The first target is the corrected request, while the second target is the pairs of reparandum and repair entity. In a validation and testing dataset, the following four abilities can be tested: handling of unknown entities; unknown templates; unknown entities and templates; and out-of-domain templates and entities. For testing the handling of unknown entities, the templates of the training dataset can be used and all entities can be replaced with entities not occurring in the training dataset. In order to test the generalization in regard to the variety of natural language, all templates of the training dataset can be replaced with unknown templates with the same semantic. To combine both described tests, only unknown entities and templates can be used. To test, for example, whether the trained model can be used for other domains or tasks without retraining, the new tasks of buying a product and attaching a specific object to a specific location can be used. In one variation, 400 request and correction pairs for validation and 1727 pairs for testing are used. The table at FIG. 6 depicts the numbers of pairs for the individual tests.

For the correction and extraction, a sequence labeling approach can be used in various embodiments. In such embodiments, the neural network is trained to label every word token in the request and correction with certain token, such as tokens for C (copy), D (delete), R1 (entity 1 potentially to be replaced), R2 (entity 2 potentially to be replaced), S1 (entity to replace entity 1), or S2 (entity to replace entity 2). For the correction target, the S1 and S2 labeled entities can be used to replace the R1 and R2 labeled entities, respectively. For the extraction target, the output can be the pairs R1 and S1 as well as R2 and S2. FIG. 7 depicts labeling for an example request and correction pair and both targets are given. For the sequence labeling, a fine-tuned version of the cased BERT base model (with 12 Transformer blocks, a hidden size of 768, 12 self-attention heads, and 110 M parameters) can be used with a Named Entity Recognition tool. Details about a cased BERT (Bidirectional Encoder Representations from Transformers) base model can be found in J. Devlin, et al., "BERT: Pre-training of deep bidirectional transformers for language understanding," Proceedings of the 2019 Conference of the North American Chapter of the Association for Computational Linguistics (NACL), 2019, which is incorporated herein by reference in its entirety. Three epochs of training datasets can be fined tuned with a starting fine-tuning learning rate of $2e^{-5}$, for example. A Transformer in this context is a deep learning model that handles sequential data but do not require the sequential data to be processed in order.

As an alternative to the sequence labeling approach, a sequence-to-sequence approach can be used where the corrected stream is directly outputted from the neuronal network. For the sequence-to-sequence approach a Transformer model can be trained or a pretrained Transformer model can be fine-tuned. Details about training a Transformer are provided in Vaswani et al., "Attention Is All You Need," arXiv 1706.03762 (2017); and details about fine-tuning a pretrained Transformer model are provided in Raffel et al., "Exploring the Limits of Transfer Learning with a Unified Text-to-Text Transformer," arXiv 1910.10683 (2019).

The architecture can be evaluated with the metric accuracy. In such an evaluation, a request and correction pair can be correctly converted if both targets, the corrected request and the pairs of reparandum and repair entity were equal to their references. FIG. 8 depicts the results for the datasets for one example instance of the invention. In this evaluated embodiment, the replacement of trained entities with unknown entities or trained templates with unknown templates did not cause problems for the trained model. Accuracies of 98.54% or 97.03%, respectively were obtained. The combination of both reduced the performance to 90.24%. An accuracy of 88.35% for out-of-domain entities and templates was obtained for this example.

Thus, the error-correction module can comprise a machine-learning neural network (or collection of neural networks) that is trained to output a corrected stream, or corrected request, based on training datasets of dialog streams for controlling the robot/machine, where the training dataset streams can include the original request and a subsequent clarification. Once trained and in an operational mode, the error-correction module can generate the corrected stream for the robot/machine based on the dialog stream sensed by the microphone or other sensing means. For example, the neural network of the error-correction module can be trained, with appropriate training examples, to identify the reparandum in the request and a repair in the correction to the request, and to generate, based on the identified reparandum and repair, the corrected stream for the machine. The error-correction module can comprise another machine-learning system, such as a neural network, to also learn new information from the identified reparandum and repair. Using the kitchen example again, if the original request is "Put the fork in the cutlery drawer" and the correction is "Not in the drawer to the left of the fridge; it should be the drawer to the right of the fridge," the error-correction module 20 can learn that the cutlery drawer is to the right of the refrigerator so that for subsequent use of the system, the computer system 14 could make the corrected request without the correction. For example, if the original request is "Put the fork in the cutlery drawer," with the new knowledge the error correction module 20 can automatically make the corrected request of, "Put the fork in the cutlery drawer, which is to the right of the refrigerator."

The neural network(s) of the error-correction module could optionally have a fixed-size or a non-fixed-size output vocabulary. Particularly, a sequence labeling approach to the neural network can have fixed-sized output vocabulary, such as C, R1, R2, D, S1, S2. In the sequence-to-sequence approach (from the dialog with correction the correct dialog is inferred directly), a non-fixed size vocabulary (e.g., all tokens of the regarded dialog including the corrections) approach in addition to a fixed size vocabulary approach can be used. A word token in these approaches could be, for example, a whole word or a sub-part of a word.

The sensing means could comprise a combination of sensing modalities. Continuing the kitchen example, the user's correction could be stating the word "Here" while simultaneously pointing to a location. This is an example of a deictic response/correction. A microphone/NLP could detect the utterance "Here" by the user and a camera could sense the location pointed to by the user. Thus, if the user's original request is "Put the knife in the cutlery drawer" and the correction is to say "No, here" while pointing to the drawer to the right of the refrigerator, the error correction module 20 can generate the corrected request, "Put the knife in the cutlery drawer, which is to the right of the refrigerator."

FIG. 9 is a diagram of the computer system 14 according to various embodiments. The illustrated computer system 14 comprises multiple processor units 2402A-B that each comprises, in the illustrated embodiment, multiple (N) sets of processor cores 2404A-N. Each processor unit 2402A-B may comprise onboard memory (ROM or RAM) (not shown) and off-board memory 2406A-B. The onboard memory may comprise primary, volatile, and/or non-volatile storage (e.g., storage directly accessible by the processor cores 2404A-N). The off-board memory 2406A-B may comprise secondary, non-volatile storage (e.g., storage that is not directly accessible by the processor cores 2404A-N), such as ROM, HDDs, SSD, flash, etc. The processor cores 2404A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a coprocessor in a device with a host processor 2410 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 2404 may train and/or implement different components of the NLP module 18 and/or the error correction module 20. For example, in one embodiment, the cores of the first processor unit 2402A may implement the NLP module 18 and the second processor unit 2402B may implement the error-correction module 20. One or more host processors 2410 may coordinate and control the processor units 2402A-B. In other embodiments, the system 2400 could be implemented with one processor unit 2402. In embodiments where there are multiple processor units, the processor units could be co-located or distributed. For example, the processor units 2402 may be interconnected by data networks, such as a LAN, WAN, the Internet, etc., using suitable wired and/or wireless data communication links. Data may be shared between the various processing units 2402 using suitable data links, such as data buses (preferably high speed data buses) or network links (e.g., Ethernet).

The software for the NLP module 18 and the error-correction module 20 and other computer functions described herein may be implemented in computer software using any suitable computer programming language, such as .NET, C, C++, or Python, and using conventional, functional, or object-oriented techniques. For example, the error-correction module 20 may be implemented with software modules stored or otherwise maintained in computer readable media, e.g., RAM, ROM, secondary storage, etc. One or more processing cores (e.g., CPU or GPU cores) of the machine learning system may then execute the software modules to implement the function of the respective machine learning system (e.g., student, coach, etc.). Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C #, COBOL, Fortran, Java, Lisp, Pascal, Object Pascal, Haskell, ML; and examples of scripting languages include Bourne script, JavaScript, Python, Ruby, Lua, PHP, and Perl.

In one general aspect, therefore, the present invention is directed to intelligent computer-based systems and methods. The system according to various implementations comprises a machine that is configured to act upon user-intentions (e.g., requests) from a user and sensing means for sensing an operational-mode communication (e.g., dialog stream) from the user for the machine. The system also comprises a computer system in communication with the sensing means. The computer system is configured to train a neural network through machine learning to output, for each training example in a training dataset, a corrected user-intention (request) for the machine. The computer system is also configured to, in an operational mode, using the trained neural network, generate a corrected, operational-mode user-intention (request) for the machine based on the operational-mode communication (dialog stream) from the user for the machine, wherein the operational-mode communication (dialog stream) is sensed by the sensing means.

A method according to the present invention can comprise training a neural network through machine learning to output, for each training example in a training dialog stream dataset, a corrected request for the machine, where the machine is configured to act upon requests from a user. The method also comprises, in an operational mode of the neural network after training the neural network: sensing, by sensing means, an operational-mode dialog stream from a user for the machine; and generating, by a computer system that is in communication with the sensing means, using the trained neural network, a corrected, operational-mode request for the machine based on the operational-mode dialog stream.

According to various implementations, the training dialog stream dataset comprises training dialog streams, where the training dialog streams each comprise a training request for the machine and a training correction for the training request; and the operational-mode dialog stream comprises an operational-mode request for the machine and an operational-mode correction to the request.

According to various implementations, the neural network is trained to identify reparandums in the training requests in the training dialog stream dataset and to identify training repairs in corrections to the training requests in the training dialog stream dataset, and to generate, based on the identified reparandums and repairs in the training dialog stream dataset, the corrected requests for the machine. The neural network is also configured to, in the operational mode, generate the corrected operational-mode request for the machine based on an operational-mode reparandum identified in the operational-mode request and an operational-mode repair identified in the operational-mode correction.

In various implementations, the neural network is configured to, in the operational mode, generate a second operational-mode corrected request for the machine based on an operational-mode reparandum identified in a second operational-mode request for the machine and an operational-mode repair identified in a prior operational-mode dialog stream for the machine.

In various implementations, the neural network is trained to assign a label to word tokens in dialog streams in the training dialog stream dataset and determine the corrected request for each training example in the training dialog stream dataset based on the assigned labels.

In various implementations, the machine comprises a robot. In such implementations, the operational-mode correction by the user can comprise a response by the user to an incorrect action by the robot. Also, the sensing means can comprise means for sensing the response by the user to the incorrect action by the robot. Also, the response can comprises a response selected from the group consisting of a physical response by the user, a verbal response by the user, a deictic response by the user, and a gesture by the user.

In various implementations, the machines comprises a processor-based device, such as a computer, a mobile device, an appliance, a home entertainment system, a personal assistant, an automotive system, a healthcare system, or a medical device.

In various implementations, the sensed operational-mode request comprises audio from the user; and the sensing means comprises a microphone and a Natural Language Processor (NLP). Also, the sensed operational-mode request could comprise an electronic message comprising text; and the sensing means could comprises a Natural Language Processor (NLP) for processing the text in the electronic message. Also, the sensing means could comprise a motion sensor, a camera, and a touch-sensitive display. The sensing means can be part of the machine; and the computer system could be part of the machine.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system comprising:

a non-transitory computer-readable medium; and one or more processor communicatively coupled to the non-transitory computer-readable medium, the one or more processors configured to execute processor-executable instructions stored in the non-transitory computer-readable medium to:

receive, from a sensing means for sensing an operational-mode communication from a user, a request indicating a user intention;

use a trained neural network to:

label every word token in the request;

determine one or more reparandums in the request based on the labels; and determine one or more repair phrases in the request based on the labels;

use a second trained neural network to determine additional semantic information based on the request;

use the trained neural network to determine a corrected user intention based on the one or more reparandums and the one or more repair phrases and the additional semantic information;

update the second trained neural network based on first semantic information within the request;

use the trained neural network to generate one or more actions based on the corrected user intention; and output one or more commands to a machine to cause the machine to perform the one or more actions.

2. The system of claim 1, wherein the one or more processors are configured to execute further processor-executable instructions stored in the non-transitory computer-readable medium to:

train the trained neural network through machine learning to output, for each training example in a training dataset, one or more updated actions; and wherein the training dataset comprises training communications, wherein the training communications each comprise a training user-intention and a training correction for the training user-intention.

3. The system of claim 2, wherein the trained neural network:

is trained to identify reparandums in the training user-intentions in the training dataset and to identify training repairs in corrections to the training user-intentions in the training dataset, and to generate, based on the identified reparandums and repairs in the training dataset, the corrected user intention; and is configured to generate the one or more actions based on a reparandum identified in the request.

4. The system of claim 3, wherein the trained neural network is configured to generate the one or more actions based on a reparandum identified in the request and a repair.

5. The system of claim 3, wherein the one or more processors are configured to execute further processor-executable instructions stored in the non-transitory computer-readable medium to use a second neural network to determine relations between reparandums and the intention within the request.

6. The system of claim 1, wherein the trained neural network has a fixed size output vocabulary.

7. The system of claim 3, wherein the trained neural network is trained to assign a label to word tokens in communications in the training dataset and determine one or more corrected user-intention for each training example in the training dataset based on the assigned labels.

8. The system of claim 1, wherein the trained neural network does not have a fixed size output vocabulary.

9. The system of claim 1, wherein the machine comprises a processor-based device selected from the group consisting of a robot, a computer, a mobile device, an appliance, a home entertainment system, a personal assistant, an automotive system, a healthcare system, and a medical device.

10. The system of claim 1, wherein:

the request comprises audio from the user; and the sensing means comprises a microphone and a Natural Language Processor (NLP).

11. The system of claim 1, wherein:

the request comprises an electronic message comprising text; and the sensing means comprises a Natural Language Processor (NLP) for processing the text in the electronic message.

12. The system of claim 1, wherein the sensing means comprises a sensor selected from the group consisting of a motion sensor, a camera, a pressure sensor, a proximity sensor, a humidity sensor, an ambient light sensor, a GPS receiver, and a touch-sensitive display.

13. The system of claim 1, wherein the sensing means is part of the machine.

14. The system of claim 1, wherein the system is part of the machine.

15. The system of claim 1, wherein the request from the user comprises an imperative request from the user for the machine.

16. The system of claim 1, wherein the request sensed by the sensing means comprises a communication modality selected from the group consisting of text, speech, physical things like gestures, head movements, actions.

17. The system of claim 1, wherein the request sensed by the sensing means comprises a dialog stream, wherein the dialog stream comprises dialog from the user.

18. A method comprising:

receiving, from a sensing means for sensing an operational-mode communication from a user, a request from a user, the request indicating a user intention;

using a trained neural network to:

label every word token in the request;

determine one or more reparandums in the request based on the labels; and determine one or more repair phrases in the request based on the labels;

using a second trained neural network to determine additional semantic information based on the request;

using the trained neural network to determine a corrected user intention based on one or more reparandums and the one or more repair phrases and the additional semantic information;

updating the second trained neural network based on first semantic information within the request;

generating, using the trained neural network, one or more actions based on the corrected user intention; and outputting one or more commands to a robotic system to cause the robotic system to perform the one or more actions.

19. The method of claim 18, further comprising training the trained neural network through machine learning to output, for each training example in a training dataset, one or more corrected user-intention for the machine, wherein the machine is configured to act upon user-intentions from a user, wherein:

the training dataset comprises training communications, wherein the training communications each comprise a training user-intention for the machine and a training correction for the training user-intention.

20. The method of claim 19, wherein:

training the trained neural network comprises training the trained neural network to identify reparandums in the training user-intentions in the training dataset and to identify training repairs in corrections to the training user-intentions in the training dataset, and to generate, based on the identified reparandums and repairs in the training dataset, one or more corrected user-intentions for the machine; and generating the corrected user intention comprises generating the corrected user intention based on a reparandum identified in the request and an operational-mode repair identified in the request.

* * * * *